(No Model.)
G. H. ZEIGLER.
VEHICLE BRAKE.
No. 498,347. Patented May 30, 1893.
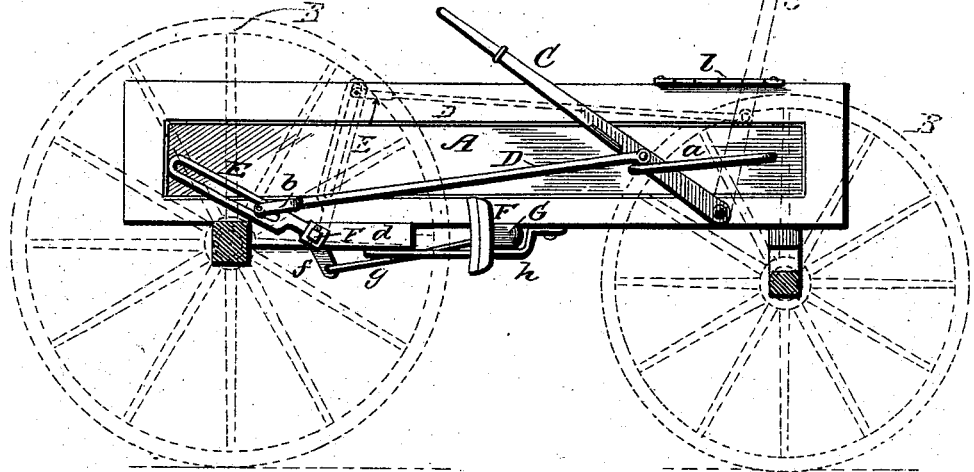
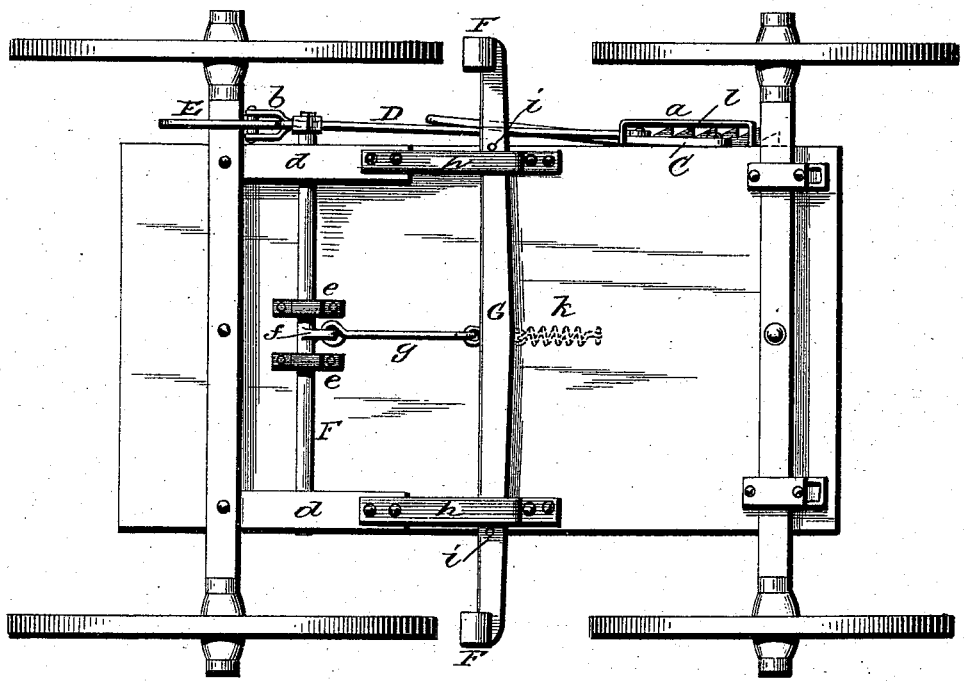
Witnesses
L. C. Hills.
M. B. Cowing.
Inventor
George H. Zeigler.
per Chas. N. Fowler
Attorney
THE NORRIS PETERS CO., PHOTO-LITHO., WASHINGTON, D. C.

UNITED STATES PATENT OFFICE.

GEORGE H. ZEIGLER, OF SPRING HOPE, PENNSYLVANIA.

VEHICLE-BRAKE.

SPECIFICATION forming part of Letters Patent No. 498,347, dated May 30, 1893.

Application filed January 14, 1893. Serial No. 458,356. (No model.)

*To all whom it may concern:*

Be it known that I, GEORGE H. ZEIGLER, a citizen of the United States, residing at Spring Hope, in the county of Bedford and State of Pennsylvania, have invented certain new and useful Improvements in Vehicle-Brakes; and I do hereby declare that the following is a full, clear, and exact description of the same, reference being had to the annexed drawings, making a part of this specification, and to the letters of reference marked thereon.

The present invention has for its object to provide a brake mechanism that will be simple in construction, effective in its operation, and readily applied to all class of vehicles as well as sleds and sleighs, and will possess increased leverage power and consequently its value materially enhanced. These several objects I attain by the construction substantially as shown in the drawings and hereinafter the described and claimed.

Figure 1 of the drawings represents a side elevation partly in section of a vehicle showing my improved brake-mechanism applied thereto; Fig. 2 an under side plan view thereof; Fig. 3 a detail view of the bifurcated end of the connecting rod in which is located the anti-friction roller.

In the accompanying drawings A represents the body of a wagon or other vehicle and B the wheels, which may be of the usual construction and is illustrated simply to show the application of my invention thereto. To the side of the wagon-body is pivoted the lower end of a hand lever C which passes up through a guide $a$ which also serves as a stop to the lever to limit its forward and backward movement and further prevents any undue lateral strain on the lever that would tend to loosen its pivotal connection with the wagon body. To the lever C is pivoted one end of a connecting rod D having its free end bifurcated as shown at $b$ to form bearings for an anti-friction roller $c$. The bifurcated end of the rod D is connected with a slotted supplemental lever E, the roller working in the slot when the hand lever is operated. This slotted supplemental lever E is detachably connected to one end of a rod F which rod has its bearings in suitable brackets $d$ connected to the under side of the wagon-body, and stops $e$ are provided in order to prevent any lateral shifting of the rod. The rod F at or near its center, has an eye $f$ for connecting thereto a link $g$, and to this link is attached the bar G, said bar carrying at its ends the brake-shoes H of the usual construction. The ends of the bar G passes through guides $h$ and is prevented from lateral shifting by means of the stops $i$ upon said bar. To assist in bringing the bar back to its normal position, a spring $k$ may be employed, this however being left to the judgment of the manufacturer. When the brake is on, the hand-lever is held in position by said lever engaging with a toothed rack $l$ upon the side of the wagon body, or by any other means found most desirable.

It will be noticed that the complete brake-mechanism is connected to the body of the vehicle and no part thereof is attached to the axle, bolster, or other portion of the running gear, hence the vehicle body can be removed with its brake mechanism without first having to detach any portion thereof from the running gear. The brake mechanism being wholly upon the body as above described, the body can be removed and runners substituted for the gearing when the body is to be used upon the runners of a sled or sleigh.

Having now fully described my invention, what I claim as new, and desire to secure by Letters Patent, is—

A brake mechanism wholly connected to the body of the vehicle, and consisting of a slotted lever, a transverse rod having its bearings in brackets upon the under side of the body and connecting with the slotted lever, a brake-bar and a link connection between it and the rod, guides for the ends of the brake-bar, a rod having a bifurcated end with roller and connecting the slotted lever with a hand lever for operating the brake, substantially as and for the purpose set forth.

In testimony that I claim the above I have hereunto subscribed my name in the presence of two witnesses.

GEORGE H. ZEIGLER.

Witnesses:
HARRY C. DAVIDSON,
E. H. BLACKBURN.